US011054394B2

(12) United States Patent
Timmons et al.

(10) Patent No.: US 11,054,394 B2
(45) Date of Patent: Jul. 6, 2021

(54) SCANNING MAGNETOMETRY MOTION COMPENSATION

(71) Applicant: The Charles Stark Draper Laboratory, Inc., Cambridge, MA (US)

(72) Inventors: Brian P. Timmons, Milford, MA (US); Sabrina Mansur, Somerville, MA (US); William Bonnice, Boston, MA (US); Rami S. Mangoubi, Newton, MA (US); Philip S. Babcock, IV, Westford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 235 days.

(21) Appl. No.: 16/115,742

(22) Filed: Aug. 29, 2018

(65) Prior Publication Data
US 2019/0064114 A1 Feb. 28, 2019

Related U.S. Application Data

(60) Provisional application No. 62/551,303, filed on Aug. 29, 2017.

(51) Int. Cl.
*G01N 27/82* (2006.01)
*G01N 27/85* (2006.01)

(52) U.S. Cl.
CPC ............ *G01N 27/82* (2013.01); *G01N 27/85* (2013.01)

(58) Field of Classification Search
CPC ........ G01N 27/82; G01N 27/85; G01N 27/72; G01N 27/00; G01N 27/83
See application file for complete search history.

(56) References Cited

U.S. PATENT DOCUMENTS 4,172,315 A * 10/1979 Marsh ............... G01N 27/84
228/174
8,542,127 B1 9/2013 Goroshevskiy et al.
(Continued)

OTHER PUBLICATIONS

European Patent Office as the International Searching Authority, Authorized Officer: Kirsi Luukkonen, International Search Report and Written Opinion of the International Searching Authority, PCT/US2018/048447, dated Nov. 21, 2018, 14 pages.

*Primary Examiner* — Mohamed Charioui
(74) *Attorney, Agent, or Firm* — Sunstein LLP

(57) ABSTRACT

A computer-implemented method is described for detecting, identifying and locating an object feature in a ferromagnetic object. At least one hardware processor executes program instructions to: define a planned scan trajectory for scanning the ferromagnetic object with a sensor array comprising a plurality of magnetometer sensors, measure magnetic fields of the ferromagnetic object with the sensor array along an actual scan trajectory at locations adjacent to the ferromagnetic material to produce object scanning data representing magnetic characteristics of the ferromagnetic object along the actual scan trajectory. The actual scan trajectory includes deviation motion of the scanning array from the planned scan trajectory. The deviation motion is then compensated for to identify and locate the object feature in the ferromagnetic object. The compensation includes adjusting the object scanning data for the deviation motion and/or using a feature model that reflects the deviation motion.

30 Claims, 12 Drawing Sheets
(4 of 12 Drawing Sheet(s) Filed in Color)

(56) References Cited

U.S. PATENT DOCUMENTS

| | | |
|---|---|---|
| 2001/0022514 A1* | 9/2001 | Light ................. G01N 29/2412 |
| | | 324/240 |
| 2009/0070063 A1* | 3/2009 | Edelstein ............... G01V 3/081 |
| | | 702/150 |
| 2011/0167914 A1 | 7/2011 | Sutherland |
| 2015/0061659 A1 | 3/2015 | Freear et al. |
| 2017/0122909 A1* | 5/2017 | Goroshevskiy ..... G01M 5/0025 |

* cited by examiner

SCANNING MAGNETOMETRY MOTION COMPENSATION

This application claims priority from U.S. Provisional Patent Application 62/551,303, filed Aug. 29, 2017, which is incorporated herein by reference in its entirety.

TECHNICAL FIELD

The present invention relates to identifying object features of a ferromagnetic object.

BACKGROUND ART

Objects made of ferromagnetic materials such as iron, steel, nickel and cobalt are susceptible to material defects such as due to imperfect manufacture, corrosion, fatigue, wear, damage, etc. To prevent catastrophic failure of structures containing such ferromagnetic objects, they may be visually inspected, either manually or using a camera and methods and systems that analyze the images, to identify material defects before a failure occurs. However, many structures are not easily inspected due to being buried underground or beneath the sea, or due to being embedded within other materials such as concrete. For large infrastructure that contains components made of ferromagnetic material, visual inspection may be impractical or too costly to perform routinely. Examples of infrastructure including such ferromagnetic objects include without limitation industrial and passenger vessels, steel pipes, oil and gas pipelines, power plant structures, oil refineries, heat exchangers, railroad rails, bridges and buildings made with steel beams and/or rebar-reinforced concrete.

It is known that many ferromagnetic objects (e.g., steel pipe) act as weak permanent magnets even when not intentionally magnetized. For example, magnetic dipoles in steel may partially orient to the Earth's magnetic field after cooling below the Curie temperature when cast or hot-rolled in the foundry. Magnetic fields present in ferromagnetic objects as stray byproducts of their manufacture are known as parasitic fields.

Magnetic inspection is well known as a method for detecting material defects in ferromagnetic objects. This involves placing a ferromagnetic object in a magnetic field, and applying magnetic particles such as iron filings to the object. A magnetic field may be provided by passing an electric current through the ferromagnetic object, or by placing the ferromagnetic object in a magnetic field generated by an electromagnet. If a material defect such as a crack is present, the magnetic particles cluster near the defect. Field strengths used for magnetic particle inspection are typically much greater than the Earth's magnetic field or those parasitic fields that may be present in ferromagnetic materials.

U.S. Patent Publication 2017/0108469 (incorporated herein by reference in its entirety) describes a scanning magnetometry system and method which includes scanning sensors for measuring magnetic field gradients from a standoff distance adjacent to ferromagnetic material. The measured magnetic field gradients are compared to magnetic field gradient models to recognize defects in ferromagnetic objects.

SUMMARY

Embodiments of the present invention are directed to computer-implemented systems and methods for locating an object feature in a ferromagnetic object. A sensor array with multiple magnetometer sensors is configured for scanning the ferromagnetic object to produce object scanning data that represents magnetic characteristics of the ferromagnetic object. Data storage memory is configured for storing the object scanning data and scanning software. A scanning processor that includes at least one hardware processor is coupled to the data storage memory and configured to execute the scanning software. The scanning software includes processor readable instructions to: (1) define a planned scan trajectory for scanning the ferromagnetic object with the sensor array, (2) measure magnetic fields of the ferromagnetic object with the sensor array at multiple locations along an actual scan trajectory adjacent to the ferromagnetic material to produce the object scanning data, wherein the actual scan trajectory includes deviation motion of the scanning array from the planned scan trajectory, and (3) compensate for the deviation motion to identify and locate an object feature in the ferromagnetic object.

In specific embodiments, compensating for the deviation motion may include adjusting the object scanning data to compensate for the deviation motion to produce adjusted scanning data representing magnetic characteristics of the ferromagnetic object along the planned scan trajectory, and identifying and locating the object feature from the adjusted scanning data. In such embodiments, defining a planned scan trajectory may specifically include defining a fundamental reference frame for scanning the ferromagnetic object. And adjusting the object scanning data may specifically include rotating the object scanning data around one or more Euler angles to the fundamental reference frame.

Identifying and locating the object feature may specifically include determining a magnetization direction of the object feature; for example, by accommodating multiple magnetic sources associated with the ferromagnetic object and/or by using object scanning data from a single magnetometer sensor on the sensor array. In addition or alternatively, identifying and locating the object feature may include using a feature model with one or more dynamically determined model parameters, for example, to apply the feature model to object scanning data that reflects the deviation motion. And adjusting the object scanning data may include determining translational corrections from the object scanning data to the planned scan trajectory and adjusting the object scanning data with the translational corrections to produce the adjusted scanning data In addition or alternatively, compensating for the deviation motion may specifically include using a feature model reflecting the deviation motion to identify the location of the object feature.

The deviation motion may specifically include motion due to rotation of the scanning array away from the planned scan trajectory and/or motion due to displacement of the scanning array away from the planned scan trajectory.

The sensor array specifically may be configured with the multiple magnetometer sensors spanning three directions, arranged on a sensor beam orthogonal to the planned scan trajectory. The object feature specifically may include a material defect where material is missing in the ferromagnetic object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A illustrates a translational displacement, while FIG. 2B shows a pure rotation.

DETAILED DESCRIPTION

Various embodiments of the present invention are directed to techniques for use in a scanning magnetometry system to account for unplanned deviation motion that occurs during the scanning process. A planned scan trajectory is defined for scanning a ferromagnetic object with a sensor array that has multiple magnetometer sensors. Magnetic fields of the ferromagnetic object are measured with the sensor array at multiple locations along an actual scan trajectory adjacent to the ferromagnetic material to produce object scanning data that represents magnetic characteristics of the ferromagnetic object, where the actual scan trajectory includes deviation motion of the scanning array from the planned scan trajectory. The measured magnetic fields are then compensated for deviation motion and used to identify and locate the object feature in the ferromagnetic object.

Figure 1A:
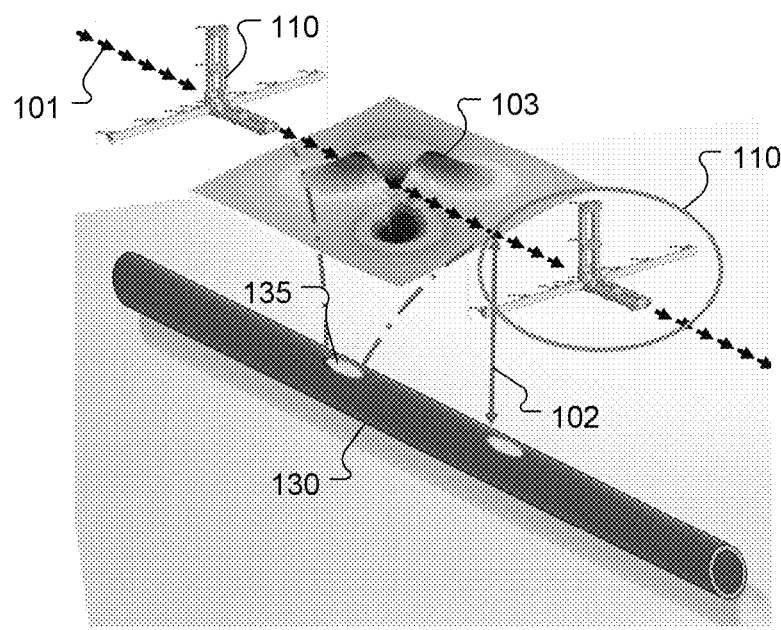
FIGS. 1A-1B show features of a scanning magnetometry arrangement for identifying and locating an object feature in a ferromagnetic object.

FIG. 1A shows a sensor array 110 of magnetometer sensors that measures the magnetic field 103 of a ferromagnetic object 130 (in this example, a pipe) about three coordinate axes, $B_x$, $B_y$, $B_z$ as the sensor array 110 scans along a scan trajectory 101 at some scanning distance 102 above the ferromagnetic object 130. In this example, the magnetometer sensors are arranged on the sensor array 110 on sensor beams that are orthogonal to the scan trajectory 101, but in other specific embodiments, a sensor array 110 may use other specific structural arrangements of magnetometer sensors.

The ferromagnetic object 130 has magnetic characteristics based on its structure, composition and fabrication history that are shown as magnetic field 103. The ferromagnetic object 130 also may have an object feature 135 that perturbs the otherwise spatially regular magnetic field 103 of the ferromagnetic object 130. As it scans the ferromagnetic object 130 along a planned scan trajectory 101, the sensor array 110 generates object scanning data that includes data characteristics of the object feature 135. The object feature 135 may be any characteristic feature external or internal to the ferromagnetic object 130 for which there is a known physics model of the resulting magnetic field. For example, the object feature 135 could be a weld or junction in the ferromagnetic object 130; an irregularity of cracked or missing metal (a "material defect") typically due to corrosion, fatigue, wear, damage or imperfect manufacture; or an intentionally-designed gap or opening in the ferromagnetic object 130. In the most general case, the object feature 135 can be detected using known physics-based field equations as a function of the position and orientation of the sensor array 110 relative to the object feature 135. Where the object feature 135 is missing metal, the magnetic field 103 appears similar that of a magnetic dipole (or collection of dipoles), so detecting the object feature 135 involves finding dipole signatures in the collected object scanning data. In the absence of a physics model, a change detection algorithm can be used, and the resulting signature can be compared to learned data.

Figure 1B:
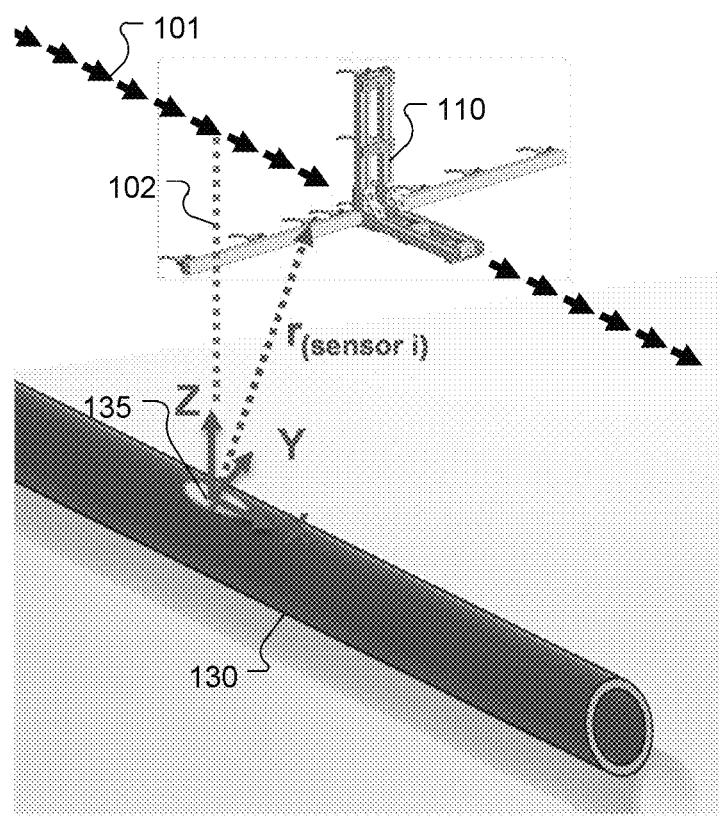

As shown in FIG. 1B, the reference coordinate axes for such scanning are defined relative to the ferromagnetic object 130, not the sensor array 110. In this case where the ferromagnetic object 130 is a pipe, then the x-axis is aligned along the longitudinal axis of the pipe in the direction of the scan, the y-axis is orthogonal to that, "across" the pipe, and the z-axis is aligned vertically out of pipe. Generally the z-axis can be in any radial direction relative to the pipe (x-axis) and the y-axis will rotate to remain orthogonal to the z-axis. For discussion convenience, the z-axis is shown and described as being vertical. Also for discussion convenience, the planned scan trajectory 101 is assumed to be directly above the ferromagnetic object 135 so that y=0. (The methods and equations also work for scans when y≠0).

These directions define the fundamental reference frame of the physics equations for the object feature 135. The dipole equations can be written with the dipole (or other model of the object feature 135) located at the coordinate origin, (0, 0, 0), and the distance from a given magnetometer sensor i to the object feature 135 is represented by a position vector $r_{sensor\_i}$ represented by coordinates (x, y, z). The magnetic field 103 associated with the object feature 135 has a given magnetization direction that needs to be accounted for in the physics model equations. For descriptive simplicity, it can be assumed that the magnetization direction of the object feature 135 is either +x or −x and aligned with the pipe along the x-axis.

The nominal orientation of the sensor array 110 is aligned with the (x, y, z) reference frame, but the actual orientation of the sensor array 110 may be displaced and/or rotated away from the nominal orientation of the planned scan trajectory. The difference between the nominal and actual orientations of the sensor array 110 can be characterized by one or more Euler angles of roll ϕ, pitch θ, and yaw ψ. Nominally the planned scan trajectory 101 is defined along the length of the pipe (along the x-axis) at a constant scanning distance 102 (constant z) above the pipe, and directly above the pipe without lateral displacement (y=0), and the beams and magnetometer axes of the sensor array 110 are aligned with the reference coordinate axes (x, y, z), so that roll ϕ, pitch θ, and yaw ψ are all 0.

Figure 2A:
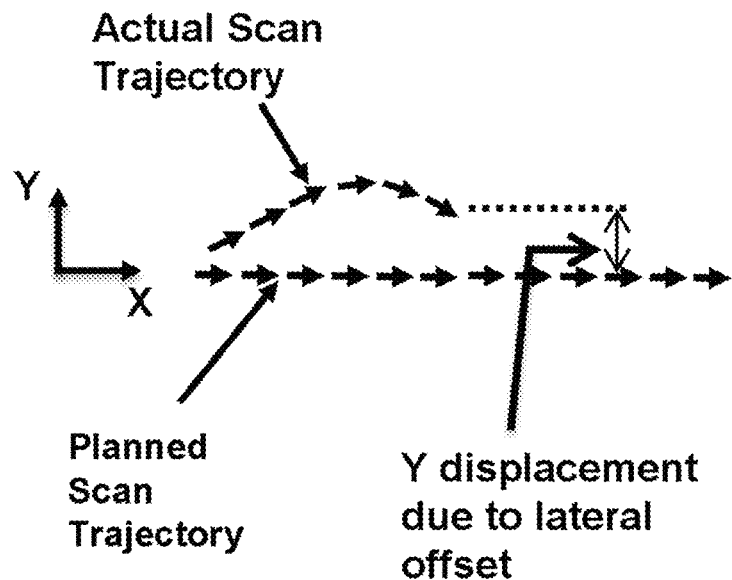
FIGS. 2A-2B show relationships between a planned scan trajectory and an actual scan trajectory.
Figure 2B:
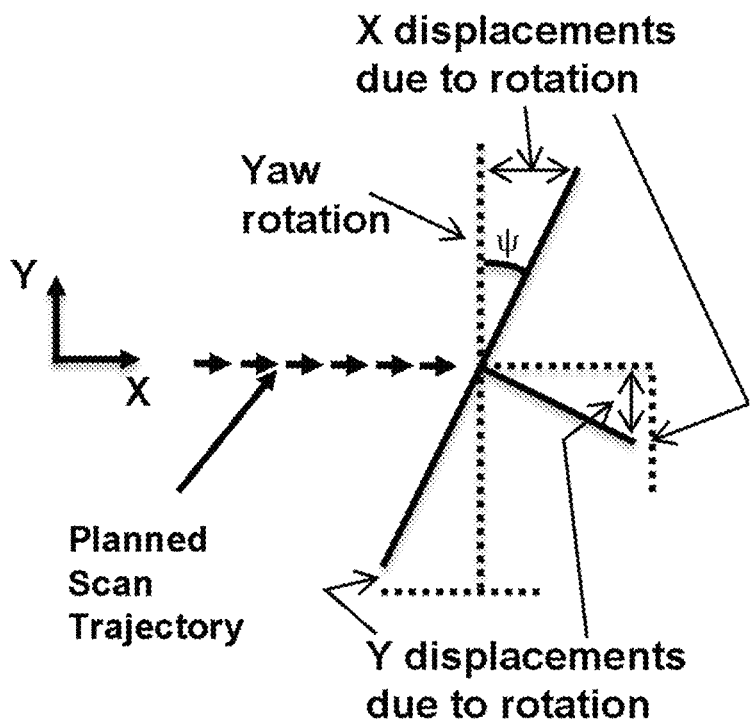

As shown in FIGS. 2A-2B, the actual scan trajectory may include displacement and rotation deviation motion of the sensor array 110 away from the planned scan trajectory 101. FIG. 2A illustrates how the sensor array 110 may be displaced away from the y-axis by some lateral offset amount. FIG. 2B shows how the sensor array 110 may be rotated away from the nominal orientation, which will cause different distance displacements at different sensor locations on the array beam. In both cases, the magnetometer sensors measure a different part of the magnetic field 103 of the ferromagnetic object 130 and calculation corrections are needed to adjust the object scanning data to represent the magnetic field 103 that would have been sensed on the planned scan trajectory 101 in the nominal orientation, or the off-nominal actual scan trajectory has to otherwise be accommodated in the analysis. To remove the effects of such deviation motions from the object scanning data, the location of the object feature 135 relative to the magnetometer sensors is needed, but at the same time, removal of the deviation motion effects is used to detect the existence of the object feature 135. This dilemma can be handled, for example, either by use of recursion or by introducing the location of the object feature 135 as a free parameter to be searched across to find a best-fit model.

Figure 3:
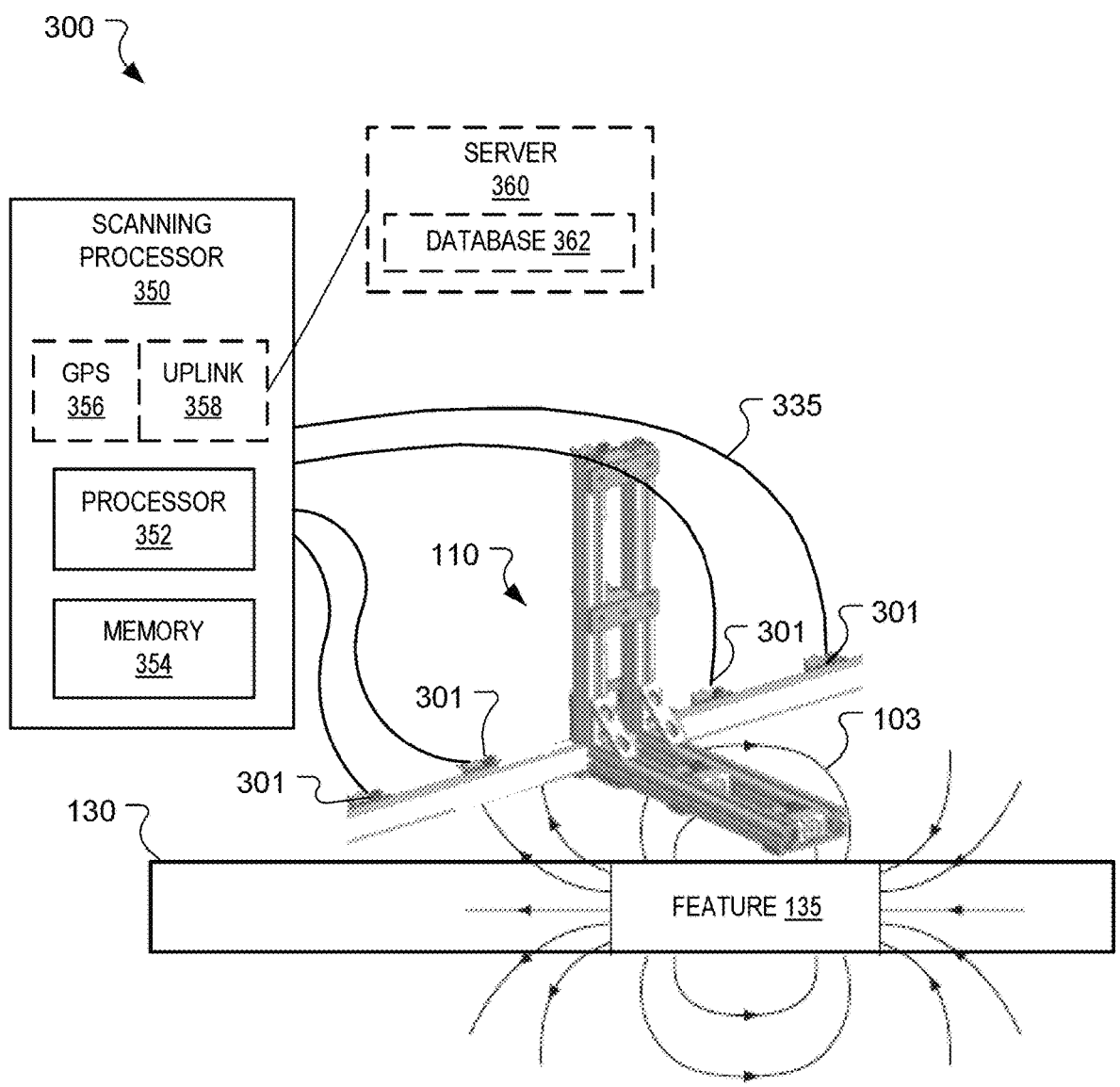
FIG. 3 shows an embodiment of a scanning magnetometry system according to the present invention.

FIG. 3 schematically illustrates one specific example of a computer-implemented scanning magnetometry system 300 according to an embodiment of the present invention for non-intrusively and non-destructively locating an object feature 135 (e.g., a material defect) in a ferromagnetic object 130. The scanning magnetometry system 300 includes a sensor array 110 with multiple magnetometer sensors 301 configured for scanning the ferromagnetic object 130. During scanning operation to inspect the ferromagnetic object 130, the sensor array 110 is positioned near and moved over the ferromagnetic object 130 for the magnetometer sensors 301 to measure object scanning data that represents the direction and magnitude of the magnetic field 103 along the actual scan trajectory.

Although FIG. 3 specifically shows that the sensor array 110 has four magnetometer sensors 301, other specific embodiments may have a different number. The sensor array 110 and its magnetometer sensors 301 are coupled via communication paths 335 (wired and/or a wireless links) to a scanning processor 350 that includes at least one hardware implanted processor device 352 that is controlled by software instructions stored in a data storage memory 354 that is also configured for storing the object scanning data. The data storage memory 354 may specifically include transitory memory such as RAM and/or non-transitory memory such as ROM, EEPROM, Flash-EEPROM, magnetic media including disk drives, optical media. The scanning processor 350 executes processor readable instructions of the scanning software from the data storage memory 354 to processes the object scanning data received from the magnetometer sensors 301 to identify and locate the object feature 135. In some embodiments, the scanning processor 350 also may have a global positioning system receiver 356 and a digital-radio uplink 358. The digital-radio uplink 358 may operate through a cell phone network, for example, to transmit or receive information to a remote server 360 that also may include a server database 362 of object feature data. In some embodiments, the scanning assembly may include an Inertial Measurement Unit, a GPS, and possibly other navigation aids, with software implementing algorithms that fuse information from all navigation sensing components in order to obtain more accurately the position and orientation of the sensor arrays, both inertially and relative to the sensed object.

Figure 4:
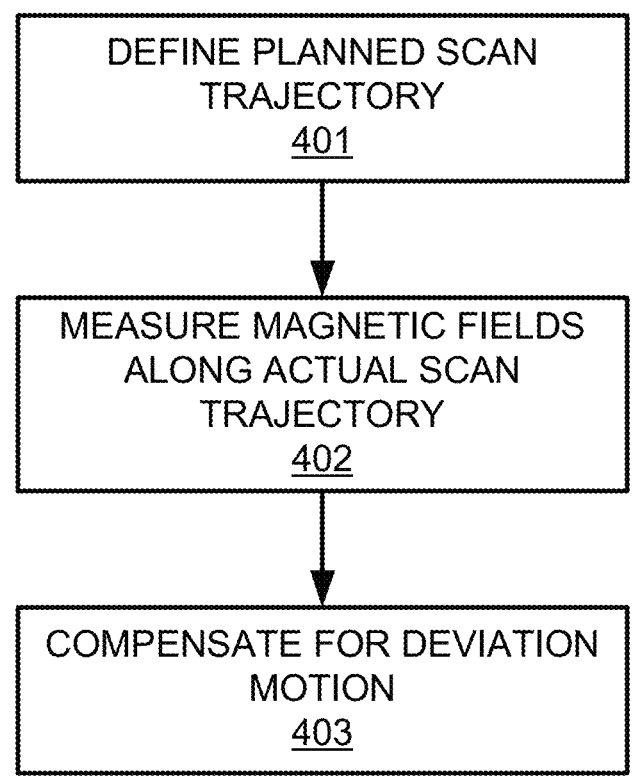
FIG. 4 shows various logical steps of a corresponding method for a scanning magnetometry system according to an embodiment of the present invention.

FIG. 4 shows various logical steps of a specific method followed by the scanning processor 150 according to the software instructions. The scanning software includes processor readable instructions to: define a planned scan trajectory for scanning the ferromagnetic object with the sensor array, step 401, measure magnetic fields of the ferromagnetic object with the sensor array at a plurality of locations along an actual scan trajectory adjacent to the ferromagnetic material (i.e., the location and orientation of the scanning sensors relative to the ferromagnetic material is known) to produce the object scanning data wherein the actual scan trajectory includes deviation motion of the scanning array from the planned scan trajectory, step 402, and compensate for the deviation motion to identify and locate the object feature in the ferromagnetic object, step 403.

Figure 5A:
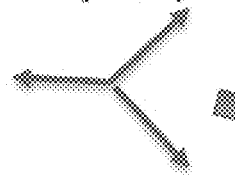
FIGS. 5A-5C show the principles of three different approaches to motion compensation according to an embodiment of the present invention.
Figure 5A:
Figure 6:
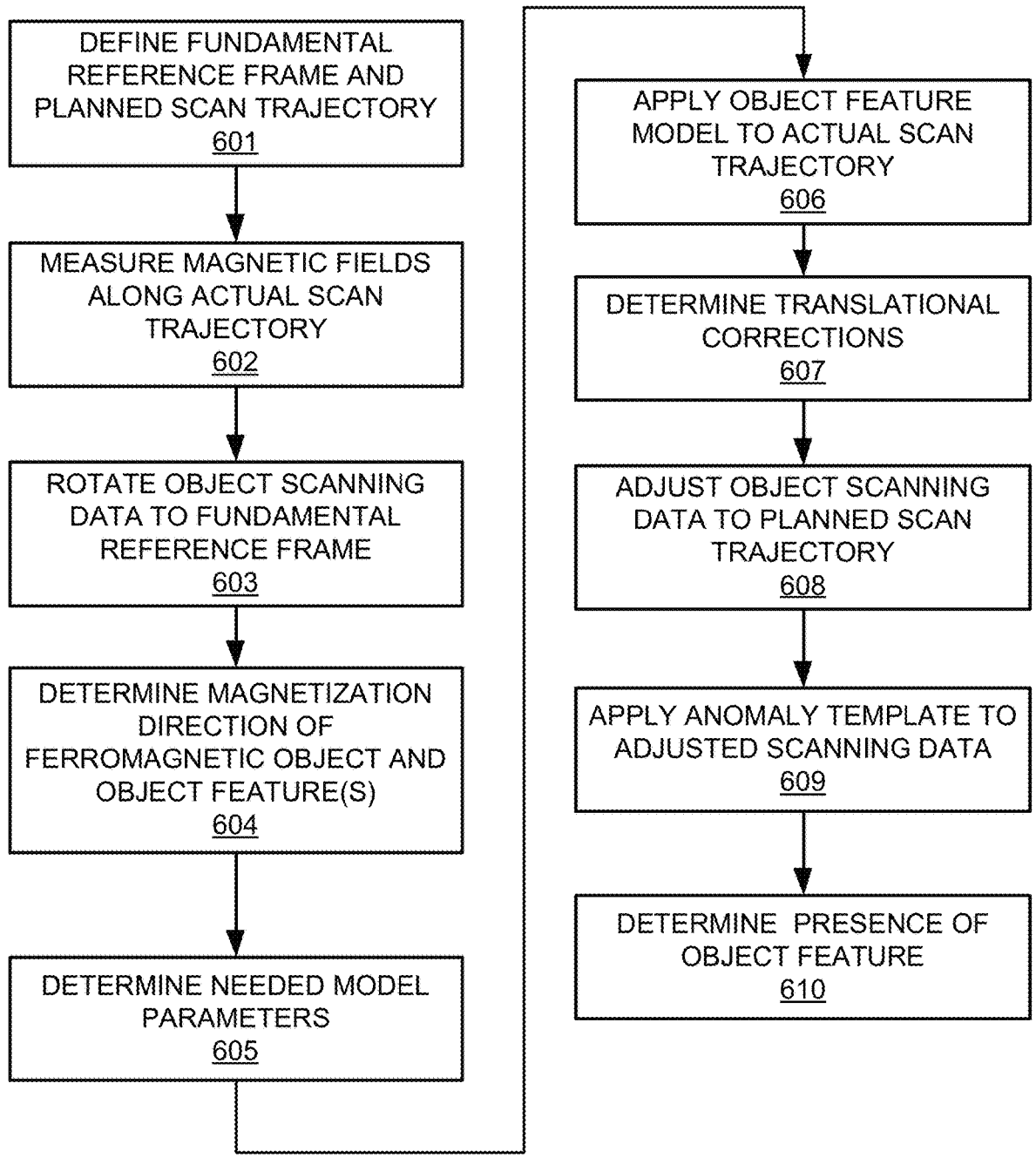
FIG. 6 shows more detailed logical steps in one specific method according to an embodiment of the present invention.

In more specific embodiments, compensating for the deviation motion, step 403 may include adjusting the object scanning data (FIG. 5A) as shown by the logical blocks in FIG. 6 to compensate for the deviation motion to produce adjusted scanning data representing magnetic characteristics of the ferromagnetic object along the planned scan trajectory. In such an embodiment, the first two steps, defining a fundamental reference frame and planned scan trajectory, step 601, and measuring the magnetic fields along an actual scan trajectory, step 602, are performed as described above.

The next step is to rotate the object scanning data to the fundamental reference frame, step 603, for which there are a variety of usable techniques. For example, one or more Euler angles of roll $\phi$, pitch $\theta$, and yaw $\psi$ from the defined fundamental reference frame to the defined reference frame can be used:

$$T = \begin{bmatrix} \cos\theta\cos\psi & \cos\psi\sin\phi\sin\theta - \cos\phi\sin\psi & \cos\phi\cos\psi\sin\theta + \sin\phi\sin\psi \\ \cos\theta\sin\psi & \cos\phi\cos\psi - \sin\phi\sin\theta\sin\psi & -\cos\psi\sin\phi + \cos\phi\sin\theta\sin\psi \\ -\sin\theta & \cos\theta\sin\phi & \cos\phi\cos\theta \end{bmatrix}$$

A rotation transformation T then can transform the measured magnetic field $\vec{B}_M$ to the fundamental reference frame $\vec{B}_R$ that contains the model equations for the object feature:

$$\vec{B}_R = T\vec{B}_M$$

Then the magnetization directions of the ferromagnetic material and the object feature are determined, step 604. This step is needed because if an incorrect magnetization direction is used, the models of the ferromagnetic object and object feature used to compensate for the off-nominal motion will be incorrect. The material of the ferromagnetic object has a given magnetic field direction, while the object feature has its own magnetic field. Deviation motion also causes field variations to be seen that have to be disregarded when determining the magnetization directions.

Figure 7A:
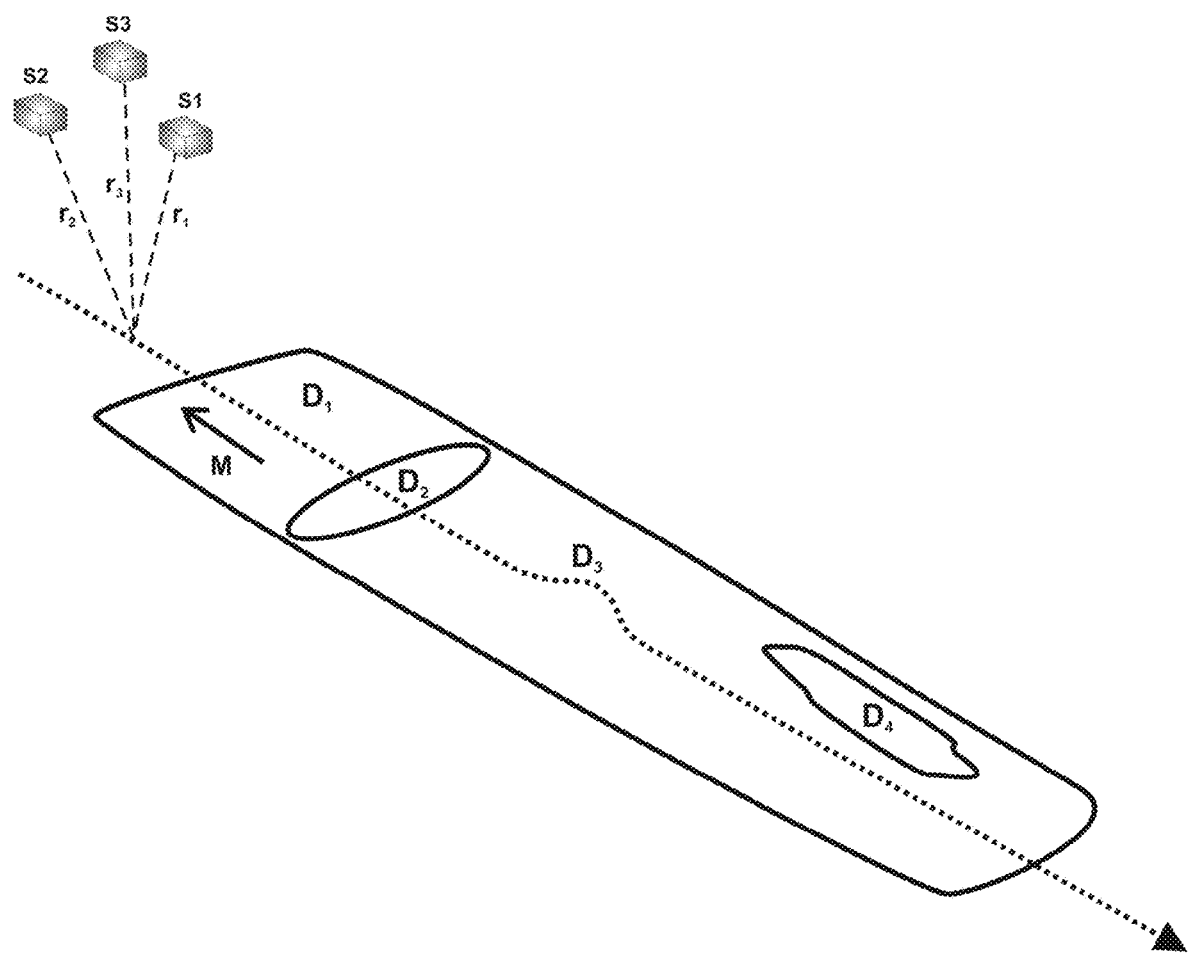
FIGS. 7A-7B show various aspects of determining the magnetization direction of an object feature according to an embodiment of the present invention.
Figure 7B:
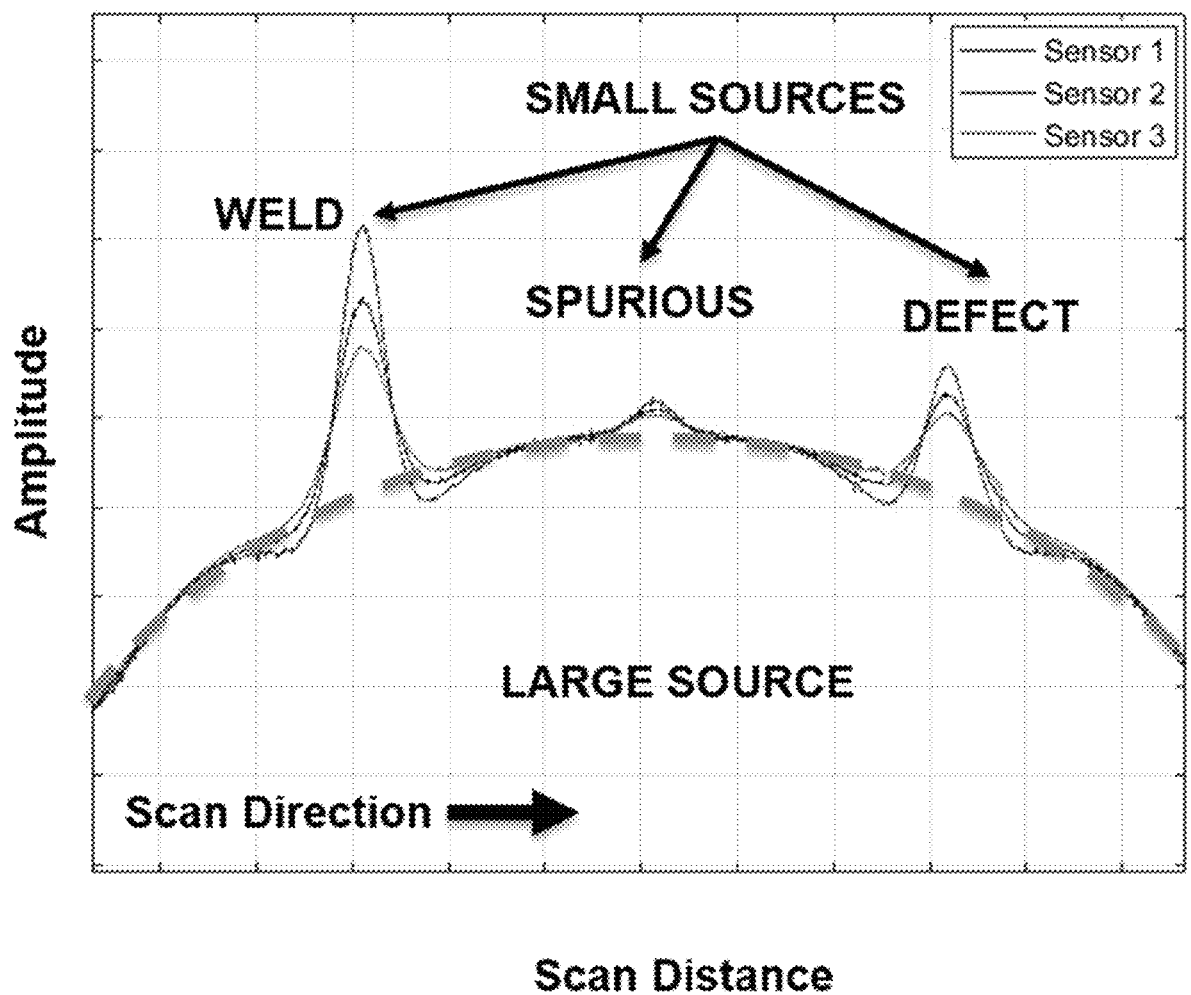

FIG. 7A shows a magnetic scan over a large ferromagnetic object by a sensor array with multiple magnetometer sensors $S_1$-$S_3$ at respective distance vector locations $r_1$-$r_3$ from a scan trajectory that passes over multiple magnetic object features $D_1$-$D_3$. FIG. 7B shows a graph of the resulting $B_x$ magnetic field vs. scan distance where the signal for the large magnetic object feature $D_1$ of the ferromagnetic object is shown as the thick dashed green line. Small magnetic object features within the ferromagnetic object could be welds ($D_2$), defects ($D_4$), and/or spurious motion ($D_3$). In fact, the direction of source magnetization for each of the different magnetic object features can be found by using just a single sensor.

Figure 8A:
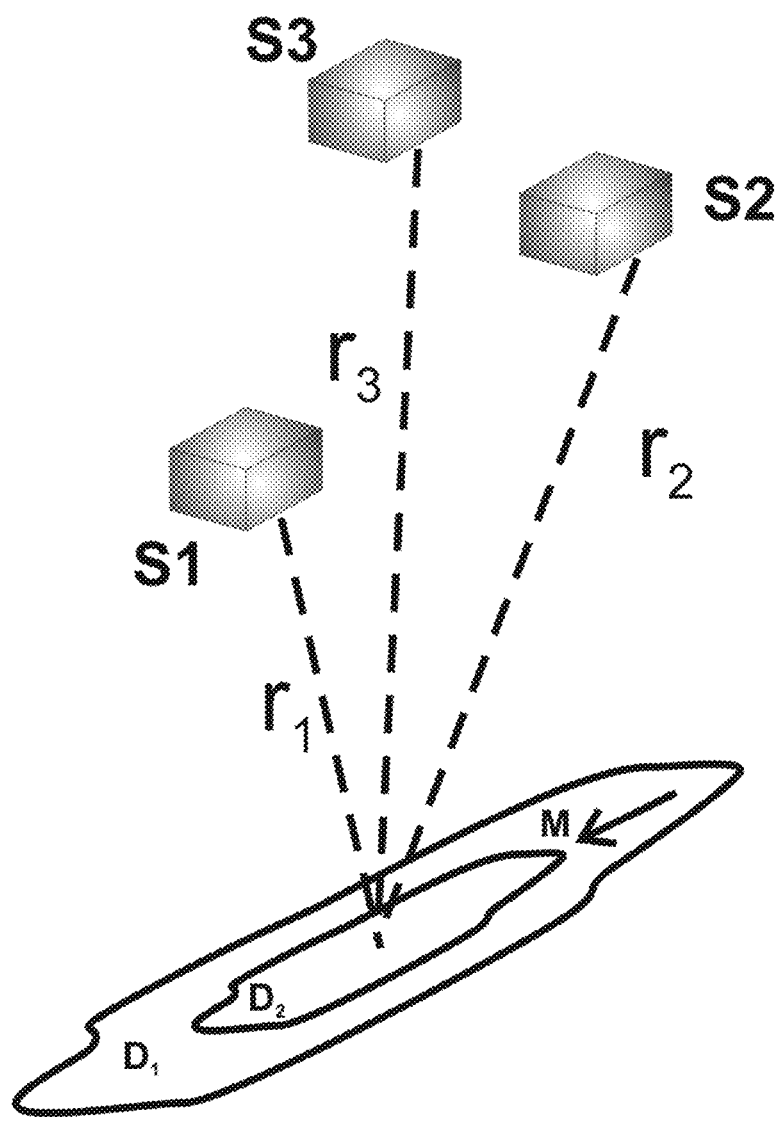
FIG. 8A-8B show aspects of determining model parameters according to an embodiment of the present invention.
Figure 8B:
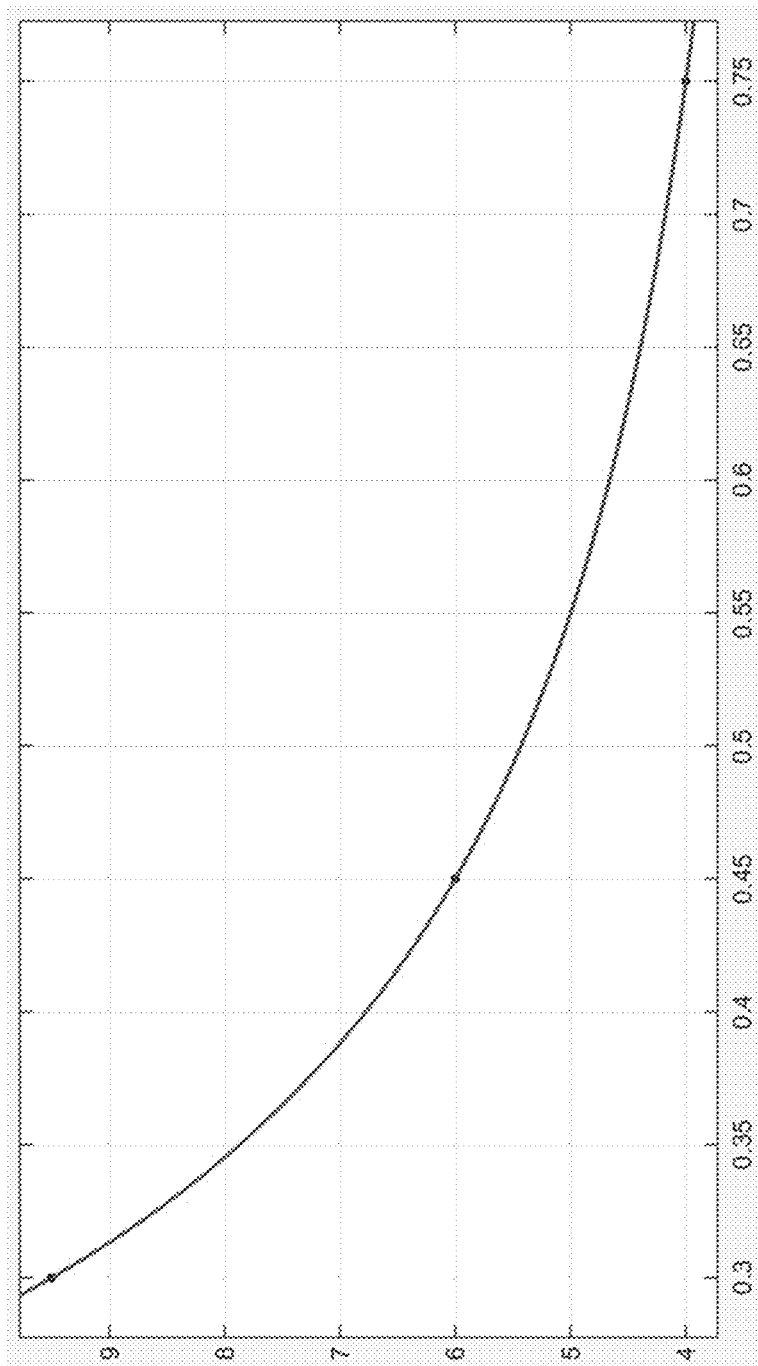

Once the magnetization direction of the object feature is correctly determined in step 604, then necessary models parameters such as decay factors are determined, step 605. In that regard, multiple magnetic sources $D_1$, $D_2$, ... each have their own decay factor. The magnetic field strength of the ferromagnetic object and its feature objects will fall off as $r^{-3}$ for a far field sensor distance r (sensor-object feature distance>lateral dimensions of the object feature). For near field sensor distance r (sensor-object feature distance<lateral dimensions of the object feature), magnetic field strength falls off as 1/r. There will also be a transition zone where the magnetic field strength rate of fall with respect to r transitions from $r^{-1}$ to $r^{-3}$. Due to the unknown size of the object feature and the various distances r from sensor-to-object feature for the sensors at different positions on the array, the proper exponent for r—the decay factor $\alpha$—needs to be determined from the measured field data. For example, the decay factor $\alpha$ can be determined using the magnetic field signals measured by three sensors with known spacing as shown in FIG. 8A. The decay factor $\alpha$ can then be determined by plotting the magnetic fields as shown in FIG. 8B as a function of sensor offset from the magnetic source of the object feature (which is known) and doing a power fit. The decay factor for large magnetic sources such as the ferromagnetic object itself can be determined from sensor measurement data absent any small sources. The decay factor for small magnetic sources is determined using data with the large source removed. Smaller magnetic sources (object features such as $D_2$) will have a higher decay factor (~2-3) while larger magnetic sources (the ferromagnetic object $D_1$) will have a smaller decay factor (~1-2).

The foregoing discussion is based on a dipole model, but other object feature models also can be used and multiple magnetic sources associated with the ferromagnetic object may need to be accommodated. A traditional dipole model has the field strength decaying as $r^{-3}$, which is valid since a dipole has zero volume and so it is always in the far field. For real object features being measured with a sensor array that has real physical extent to the sensor locations, the decay factor $\alpha$ can be treated as a variable as described in the previous paragraph. The dipole equations using the decay factor $\alpha$ are referred to as an extended dipole model that can be used to adjust the measured magnetic field for estimated deviations in position $$B_x = \frac{k(3x^2 - r^2)}{r^\alpha} \quad B_y = \frac{3kxy}{r^\alpha} \quad B_z = \frac{3kxz}{r^\alpha}$$

where $\alpha$ is the decay factor, k is proportional to the magnetization of the magnetic object feature, and the sensor distance $r=\sqrt{x^2+y^2+z^2}$ where x, y, and z are in the fundamental reference frame.

Once the necessary model parameters have been determined in step 605, then the sensor measurements can be adjusted for actual sensor position that reflects deviation motion within the actual scan trajectory: applying the anomaly template to the actual scan trajectory, step 606, then determining translational corrections from the measured field to the planned scan trajectory field, step 607, and adjusting the object scanning data to the planned scan trajectory field, step 608. For example, an inverse power law model can be used to adjust the measured magnetic field for estimated deviations in sensor position based on extended dipole model equations with a decay factor $\alpha$:

$$B_x = \frac{k(3x^2 - r^2)}{r^\alpha} \quad B_y = \frac{3kxy}{r^\alpha} \quad B_z = \frac{3kxz}{r^\alpha}$$

The signal change due to deviation motion can then be calculated:

$$\Delta B_x = k\left(\frac{3(x_o + x_f)^2 - ((x_o + x_f)^2 + (y_o + y_f)^2 + (z_o + z_f)^2)}{((x_o + x_f)^2 + (y_o + y_f)^2 + (z_o + z_f)^2)^{\frac{\alpha}{2}}} - \frac{3x_R((x_o)^2 + (y_o)^2 + (z_o)^2)}{((x_o)^2 + (y_o)^2 + (z_o)^2)^{\frac{\alpha}{2}}}\right)$$

$$\Delta B_y = 3k\left(\frac{(x_o + x_f)(y_o + y_f)}{((x_o + x_f)^2 + (y_o + y_f)^2 + (z_o + z_f)^2)^{\frac{\alpha}{2}}} - \frac{x_o y_o}{((x_o)^2 + (y_o)^2 + (z_o)^2)^{\frac{\alpha}{2}}}\right)$$

$$\Delta B_z = 3k\left(\frac{(x_o + x_{off})(z_o + z_{off})}{((x_o + x_f)^2 + (y_o + y_f)^2 + (z_o + z_f)^2)^{\frac{\alpha}{2}}} - \frac{x_o y_o}{((x_o)^2 + (y_o)^2 + (z_o)^2)^{\frac{\alpha}{2}}}\right)$$

Then the change in signal $\Delta B_{x,y,z}$ can be applied to the rotation adjusted signal $B_R$: $B_{x,y,z_{Adj}} = B_R - \Delta B_{x,y,z}$. This compensation must be done for each multiple magnetic sources associated with the ferromagnetic object close to the sensor array.

Once the scanning data has been adjusted to the planned scan trajectory in step 608, the presence of object features is determined. The object feature location is assumed to be the current location of the sensor array and is modeled by an anomaly template which is applied to the adjusted scanning data, step 609. Given these model parameters, the best match to the anomaly template using a measurement equation for the planned scan trajectory is determined:

$$X = S\theta_d + F\varphi_d + U\psi_d + n$$

where X is the gradient measurement vector across the measurement interval that represents the measured field from all of the sensors at each point in time as the scan progresses. We note that a single approximate frame may be used for the entire interval, or adjustment through transformations at each time step may be necessary. S is an anomaly template subspace basis matrix representation across the measurement interval that captures the canonical anomaly template model (in this case, a dipole) where each row of S represents specific spatial gradients in specific field directions. $\theta_d$, $\varphi_d$, and $\psi_d$ are scaling parameter vectors estimated from measurements where the d subscript indicates detection. F is a known interference (e.g., bias, flanges, etc.) subspace matrix representation, U is an unknown interference subspace matrix representation, and n is a noise vector (e.g., Gaussian or generalized Gaussian) and is part of the measurement X. The object feature can be characterized by the parameter vector $\theta_d$, which allows for small deviations from the nominal orientation. A hypothesis test to determine the presence of the object feature, step 610, can be performed to determine if a given measurement signal is due to an object feature or some other unknown interference that is not of interest:

$$H0: X = F\varphi_d + U\psi_d + n$$

$$H1: X = S\theta_d + F\varphi_d + n$$

Figure 5B:
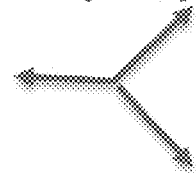
Figure 5B:
Figure 9:
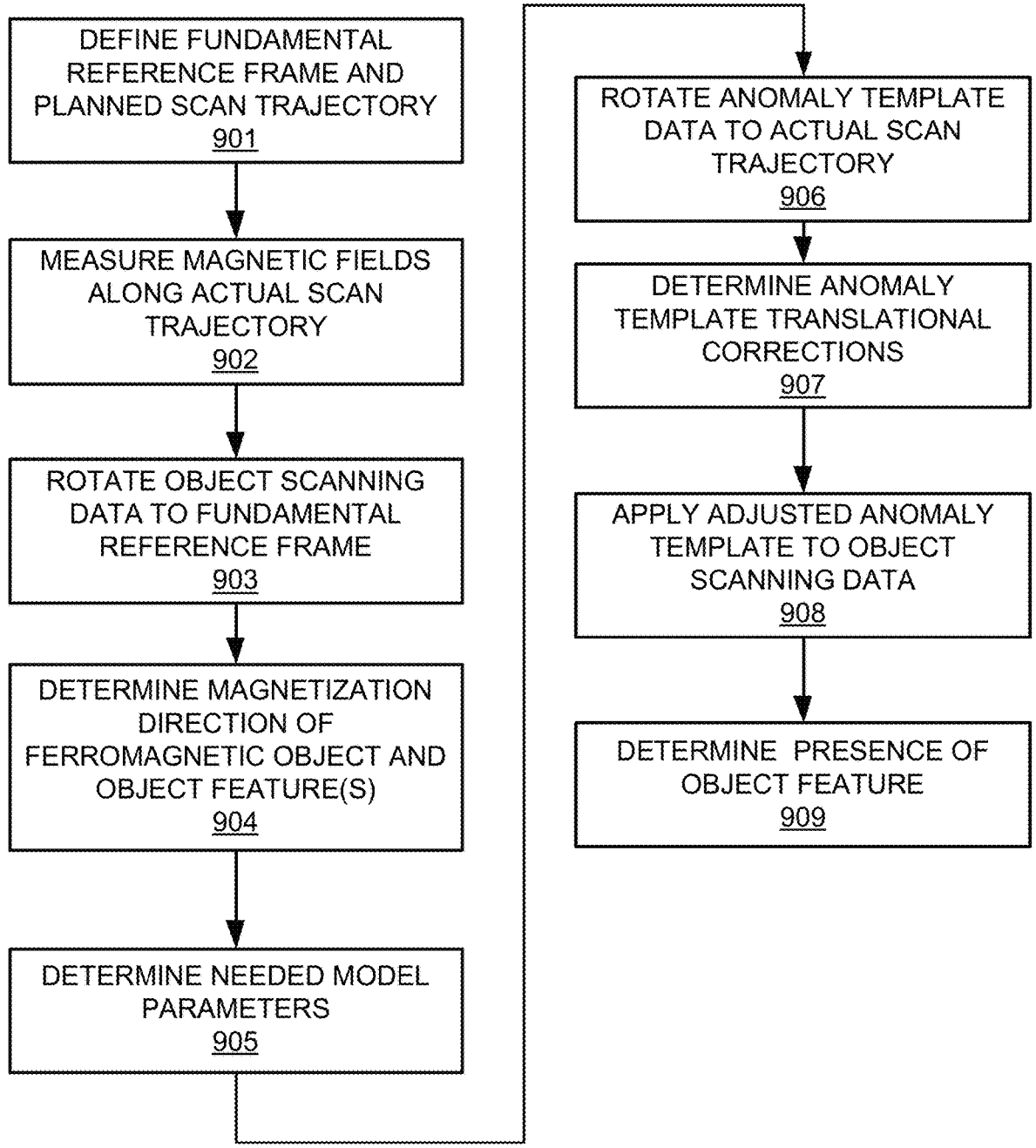
FIG. 9 shows various logical steps in a specific method according to another embodiment of the present invention.

Rather than transforming object scanning data back to the planned scan trajectory as described above (FIG. 5A), an embodiment of the present invention may instead compensate for deviation motion in the actual scan trajectory in the detection methods and systems as shown by transforming anomaly templates in the model space from the nominal reference trajectory reference frame R to the off-nominal actual scan or measurement trajectory reference frame M (FIG. 5B), as shown by the logical steps in FIG. 9. Initial steps 901 and 902 are performed as described above with regards to steps 601 and 602. The scanned data is then rotated to the local reference frame of the actual scan trajectory, step 903, to assist in determined the magnetization direction of the scanned object and object features, step 904. The model parameter decay factor α (step 905) is also dynamically calculated as discussed above. The object feature location is assumed to be the current location of the sensor array. The anomaly template is rotated, step 906, and translated into the local reference frame of the actual scan trajectory (FIG. 5B), step 907. Given these model parameters, the best match to the anomaly template using a measurement equation for the planned scan trajectory is determined, step 908:

$$X_M = S_M \theta_M + F_M \varphi_M + U_M \psi_M + n_M$$

where $X_M$ is the gradient measurement vector in the actual off nominal measurement trajectory frame M across the measurement interval that represents the measured field from all of the sensors at each point in time as the scan progresses. The subspace $S_M$ is obtained from the corresponding subspace $S_R$ expressed in the reference frame using the method described above. The noise vector is denoted $n_M$ (e.g., Gaussian or generalized Gaussian), and is part of the measurement $X_M$. Finally, the parameters $\theta_M$, $\varphi_M$, and $\psi_M$ are scaling parameter vectors estimated from measurements. A hypothesis test to determine the presence of the object feature, step 909, can be performed to determine if a given measurement signal is due to an object feature or some other unknown interference that is not of interest. As expressed in the measurement frame M, this test would be:

$$H0: X_M = + F_M \varphi_M + U_M \psi_M + n_M$$

$$H1: X_M = S_M \theta_M + F_M \varphi_M + n_M$$

Figure 5C:
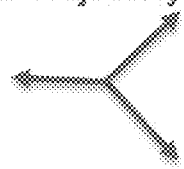
Figure 5C:
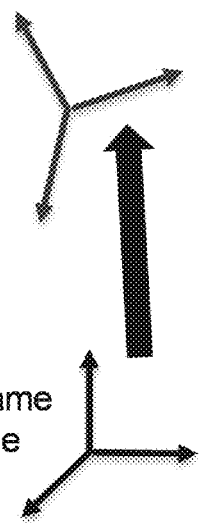
Figure 10:
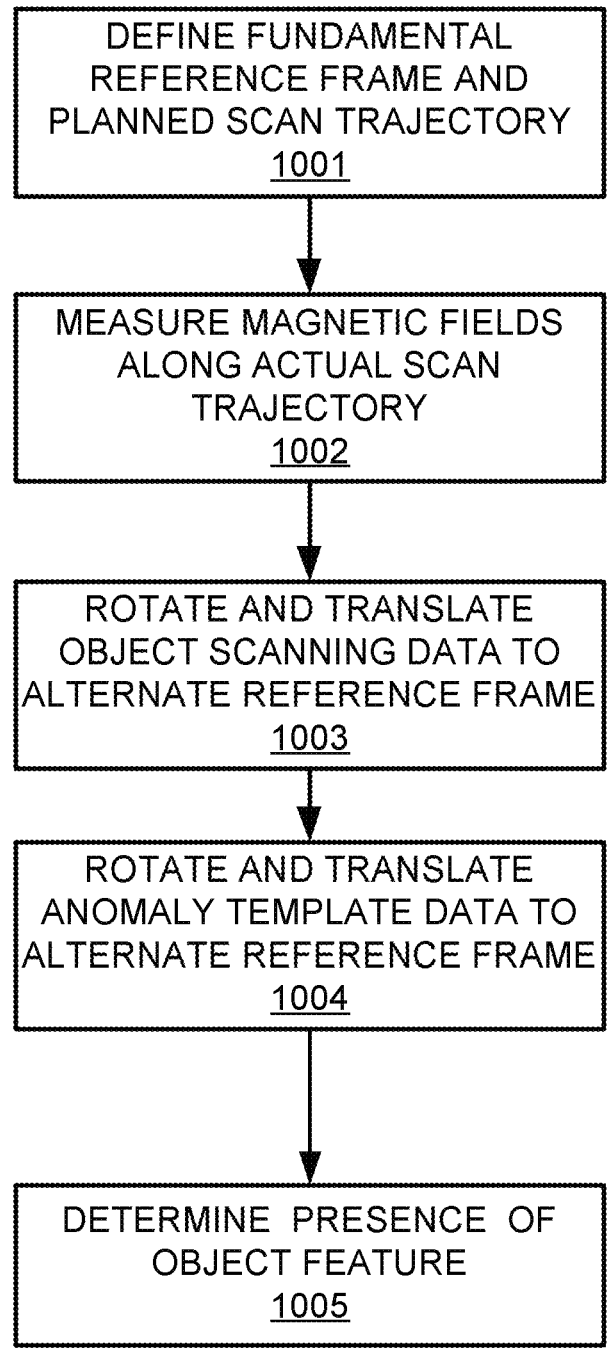
FIG. 10 shows various logical steps in a specific method according to another embodiment of the present invention.

A third alternate reference frame may be preferred by the user. Both the measurements collected in the off nominal trajectory frame and the anomaly templates expressed in the nominal trajectory frame are transformed to that third alternate reference frame (FIG. 5C) as shown by the logical steps in FIG. 10. The initial steps are the same as in the above described embodiments, defining the fundamental reference frame and planned scan trajectory, step 1001, and measuring the magnetic fields along the actual scan trajectory, step 1002. Then the object scanning data is rotated to the alternate reference frame, step 1003, and the feature model data similarly is rotated to the same alternate reference frame, step 1004. Once all the data has been transformed into the alternate reference frame, the presence of the object feature can be determined, step 1005, as described in detail above.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method employing at least one hardware implemented computer processor for detecting, identifying and locating an object feature in a ferromagnetic object, the method comprising:
 operating the at least one hardware processor to execute program instructions to:
 define a planned scan trajectory for scanning the ferromagnetic object with a sensor array comprising a plurality of magnetometer sensors;
 measure magnetic fields of the ferromagnetic object with the sensor array at a plurality of locations along an actual scan trajectory adjacent to the ferromagnetic object to produce object scanning data representing magnetic characteristics of the ferromagnetic object along the actual scan trajectory, wherein the actual scan trajectory includes deviation motion of the scanning array from the planned scan trajectory; and
 compensate for the deviation motion to identify and locate the object feature in the ferromagnetic object, wherein the instructions to compensate for the deviation motion include at least one of: (a) instructions to adjust the object scanning data to compensate for the deviation motion and (b) instructions to use a feature model that reflects the deviation motion.

2. The method according to claim 1, wherein the instructions to compensate for the deviation motion include:
 instructions to adjust the object scanning data to compensate for the deviation motion to produce adjusted scanning data representing magnetic characteristics of the ferromagnetic object along the planned scan trajectory, and instructions to identify and locate the object feature from the adjusted scanning data.

3. The method according to claim 2, wherein the instructions to define a planned scan trajectory include instructions to define a fundamental reference frame for scanning the ferromagnetic object.

4. The method according to claim 3, wherein the instructions to adjust the object scanning data include instructions to rotate the object scanning data around one or more Euler angles to the fundamental reference frame.

5. The method according to claim 2, wherein the instructions to identify and locate the object feature include instructions to determine a magnetization direction of the object feature.

6. The method according to claim 5, wherein the instructions to determine a magnetization direction include instructions to accommodate a plurality of magnetic sources associated with the ferromagnetic object.

7. The method according to claim 5, wherein the instructions to determine a magnetization direction include instructions to use object scanning data from a single magnetometer sensor on the sensor array.

8. The method according to claim 2, wherein the instructions to identify and locate the object feature include instruction to use a feature model with one or more dynamically determined model parameters.

9. The method according to claim 8, wherein the instructions to use the feature model include instructions to apply the feature model to object scanning data reflecting the deviation motion.

10. The method according to claim 2, wherein the instructions to adjust the object scanning data include instructions to determine translational corrections from the object scanning data to the planned scan trajectory and instructions to adjust the object scanning data with the translational corrections to produce the adjusted scanning data.

11. The method according to claim 1, wherein the instructions to compensate for the deviation motion include instructions to use a feature model reflecting the deviation motion to identify and locate the object feature.

12. The method according to claim 1, wherein the deviation motion includes motion due to rotation of the scanning array away from the planned scan trajectory.

13. The method according to claim 1, wherein the deviation motion includes motion due to displacement of the scanning array away from the planned scan trajectory.

14. The method according to claim 1, wherein the sensor array is configured with the plurality of magnetometer sensors arranged on a sensor beam orthogonal to the planned scan trajectory.

15. The method according to claim 1, wherein the object feature includes a material defect where material is missing in the ferromagnetic object.

16. A computer-implemented system for identifying and locating an object feature in a ferromagnetic object, the system comprising:
    a sensor array with a plurality of magnetometer sensors configured for scanning the ferromagnetic object to produce object scanning data representing magnetic characteristics of the ferromagnetic object;
    data storage memory configured for storing the object scanning data and scanning software;
    a scanning processor including at least one hardware processor coupled to the data storage memory and configured to execute the scanning software, wherein the scanning software includes processor readable instructions to:
        define a planned scan trajectory for scanning the ferromagnetic object with the sensor array;
        measure magnetic fields of the ferromagnetic object with the sensor array at a plurality of locations along an actual scan trajectory adjacent to the ferromagnetic object to produce the object scanning data, wherein the actual scan trajectory includes deviation motion of the scanning array from the planned scan trajectory; and
        compensate for the deviation motion to identify and locate the object feature in the ferromagnetic object, wherein the instructions to compensate for the deviation motion include at least one of: (a) instructions to adjust the object scanning data to compensate for the deviation motion and (b) instructions to use a feature model that reflects the deviation motion.

17. The system according to claim 16, wherein the instructions to compensate for the deviation motion include:
    instructions to adjust the object scanning data to compensate for the deviation motion to produce adjusted scanning data representing magnetic characteristics of the ferromagnetic object along the planned scan trajectory, and
    instructions to identify and locate the object feature from the adjusted scanning data.

18. The system according to claim 17, wherein the instructions to define a planned scan trajectory include instructions to define a fundamental reference frame for scanning the ferromagnetic object.

19. The system according to claim 18, wherein the instructions to adjust the object scanning data include instructions to rotate the object scanning data around one or more Euler angles to the fundamental reference frame.

20. The system according to claim 17, wherein the instructions to identify and locate the object feature include instructions to determine a magnetization direction of the object feature.

21. The system according to claim 20, wherein the instructions to determine a magnetization direction include instructions to accommodate a plurality of magnetic sources associated with the ferromagnetic object.

22. The system according to claim 20, wherein the instructions to determine a magnetization direction include instructions to use object scanning data from a single magnetometer sensor on the sensor array.

23. The system according to claim 17, wherein the instructions to identify and locate the object feature include instructions to use a feature model with one or more dynamically determined model parameters.

24. The system according to claim 23, wherein the instructions to use the feature model include instructions to apply the feature model to object scanning data reflecting the deviation motion.

25. The system according to claim 17, wherein the instructions to adjust the object scanning data include instructions to determine translational corrections from the object scanning data to the planned scan trajectory and adjusting the object scanning data with the translational corrections to produce the adjusted scanning data.

26. The system according to claim 16, wherein the instructions to compensate for the deviation motion include instructions to use a feature model reflecting the deviation motion to identify and locate the object feature.

27. The system according to claim 16, wherein the deviation motion includes motion due to rotation of the scanning array away from the planned scan trajectory.

28. The system according to claim 16, wherein the deviation motion includes motion due to displacement of the scanning array away from the planned scan trajectory.

29. The system according to claim 16, wherein the sensor array is configured with the plurality of magnetometer sensors arranged on a sensor beam orthogonal to the planned scan trajectory.

30. The system according to claim 16, wherein the object feature includes a material defect where material is missing in the ferromagnetic object.

* * * * *